United States Patent [19]
Kurokawa et al.

[11] Patent Number: 4,479,910
[45] Date of Patent: Oct. 30, 1984

[54] METHOD FOR PRODUCTION OF OPTICAL FIBER CONNECTORS

[75] Inventors: Takashi Kurokawa; Tetsuo Yoshizawa; Shigeo Nara, all of Ibaraki, Japan

[73] Assignee: Nippon Telegraph & Telephone Public Corp., Tokyo, Japan

[21] Appl. No.: 368,028

[22] Filed: Apr. 13, 1982

[30] Foreign Application Priority Data

Apr. 22, 1981 [JP] Japan .................................. 56-59660
Jun. 19, 1981 [JP] Japan .................................. 56-93731

[51] Int. Cl.³ .......................... B29D 11/00; G02B 5/14
[52] U.S. Cl. .................................. 264/2.5; 204/281; 249/144; 264/1.5; 264/222; 264/226; 264/274; 264/278; 350/96.20; 350/96.21
[58] Field of Search ................ 264/2.5, 1.5, 225, 226, 264/278, 274, 102, 328.1, 220; 350/96.20, 96.21; 204/281; 249/151, 144

[56] References Cited

U.S. PATENT DOCUMENTS

| | | | |
|---|---|---|---|
| 2,351,181 | 6/1944 | Bangasser | 264/278 X |
| 2,879,209 | 3/1959 | Fialkoff | 204/281 |
| 3,238,287 | 3/1966 | Chapman | 264/278 X |
| 3,263,520 | 8/1966 | Tschanz | 264/278 X |
| 3,330,004 | 7/1967 | Cloyd et al. | 264/278 X |
| 3,474,999 | 10/1969 | Shupe | 249/151 |
| 4,040,597 | 8/1977 | Pierson et al. | 249/146 |
| 4,303,304 | 12/1981 | Ruiz | 264/1.5 |
| 4,404,010 | 9/1983 | Bricheno et al. | 264/1.5 |

FOREIGN PATENT DOCUMENTS

56-89709 7/1981 Japan .................................. 350/96.2

Primary Examiner—Donald E. Czaja
Assistant Examiner—James C. Housel
Attorney, Agent, or Firm—Burgess, Ryan & Wayne

[57] ABSTRACT

Disclosed are methods for production of plastic optical fiber connectors specifically for production of plastic plug ferrules employable for plastic optical fiber connectors, wherein improvements are realized to decrease the production cost thereof, to enable accurate finished dimension thereof, to enhance the advantage of mass production thereof, and to decrease the connection loss thereof. The method comprises (1) a step to produce a round hole at the center of one end of a rod, the round hole having a diameter approximately identical to that of a bare fiber of optical fibers to be connected with each other, (2) a step to insert a pin to the round hole to produce a master mold, (3) a step to employ an electroform process such as a nickel plating process to plate a metal layer to a predetermined thickness on the external surface of the master mold for the purpose to produce an electroformed mass, (4) a step to draw the master mold from the electroformed mass, remaining the pin alone in the electroformed mass, for the purpose to produce an electroformed mold, (5) a step to produce a metal mold by assembling the electroformed mold, a pipe and a pair of upper and lower metal dies, and (6) a step to fill a molten resin or plastic into the cavity of the metal mold for the ultimate purpose to produce a plastic plug ferrule to be assembled in a plug employable for a plastic optical fiber connector.

5 Claims, 23 Drawing Figures

METHOD FOR PRODUCTION OF OPTICAL FIBER CONNECTORS

BACKGROUND OF THE INVENTION

1. Field of the Invention

The present invention relates to methods for production of optical fiber connectors and, more specifically, to a method for production of a plug ferrule assembled in a plug which, in combination with an adaptor, comprises an optical fiber connector produced of a plastic. And a method for production of a sleeve assembled in an adaptor which, in combination with a plug, constitutes an optical fiber connector produced of a plastic.

2. Brief Description of Prior Arts

An optical transmission system absolutely requires equipment for connection of optical fibers or an optical fiber connector. In view of an increasingly larger potential demand assumed in the near future for optical fiber connectors, it is required to develop an optical fiber connector which is light in weight and which is easy to assemble and which can be produced at a low cost.

Included in the major functions required for an optical fiber connector are that it allows precise butting arrangement for the ends of optical fibers to be connected with each other between the ends of the cores thereof which ordinarily have a diameter of several ten micrometers and that it readily keeps the precisely butted position under any environmental condition. In other words, it is essential to precisely arrange two optical fibers to be connected to each other within a radial tolerance of several micrometers. Therefore, the performance of a plug ferrule with which the optical fibers are positioned, is an important parameter which determines the performance of an optical fiber connector. Particularly, the quality of the material of which the plug ferrule is produced and the dimensional accuracy of tolerance with which the plug ferrule is produced are important to allow the plug ferrule to satisfy the foregoing requirements.

An exemplary method, available in the prior art, for production of such a plug ferrule is disclosed in a Japanese patent application published under the Laying-open No. 55-67714 in Japan. A plug ferrule produced employing the method available in the prior art, is provided with a capillary having a small hole of which the diameter is slightly larger than the diameter of optical fibers to be connected and which is bored at the center thereof, the capillary being fitted in a hollow metal collar, after it is inserted in the metal collar. The capillary having a cylindrical shape is produced by machining the internal and the external surface of a cylinder made of a sintered material e.g. some of the ceramics, after a center hole is bored in the cylinder. The metal collar is produced by means of precision machining. Thereafter, the capillary is fitted in a hole of the metal collar. The external surface of the metal collar is machined, while the metal collar is rotated centering around the small hole of the capilary. The foregoing method is effective to produce a plug ferrule which has an accurate external diameter and which has a low amount of eccentricity of the small hole in relation to the external surface of the plug ferrule. However, the foregoing method, available in the prior art, is inevitably involved with a drawback in which a high grade of machining technique employing extremely expensive machinery is required, because high precision machining applied to a hard material such as some of the sintered materials or ceramics is essential for the method. Further, the method is involved with drawbacks in which the productivity is low and the production cost is expensive.

Various efforts have been used for development of methods for production of a plug ferrule employable for an optical fiber connector in which plastics are employed as the material, for the ultimate purpose of lessening the production cost of the plug ferrule. For example U.S. Pat. Nos. 4,107,242 and 4,173,389 disclose a method for production of a plastic plug ferrule which is based on an idea to employ a metal mold employable for an insertion molding process and a jig. Namely, the method comprises a step to set an optical fiber in a metal mold and a step to inject some quantity of epoxy resin into the mold, for the purpose to form a mass containing the optical fiber and the plug ferrule in one body. Unfortunately, however, this method can not be free from a drawback in which a plug ferrule must be connected with an optical fiber prior to shipment, because the foregoing method is allowed to be employed only at a factory rather than under a field condition. Further, since the process for forming a mass containing an optical fiber and a plug ferrule in one body in accordance with the foregoing method is rather complicated, the foregoing method is not appropriate for mass production.

OBJECTS AND SUMMARY OF THE INVENTION

An object of the present invention is to provide a method for production of an optical fiber connector made of a plastic, wherein improvements are realized to decrease the production cost thereof, to enable accurate finished dimension therefor and to enhance the advantage of mass production therefor.

Another object of the present invention is to provide a method for production of a plug ferrule employable for a plastic optical fiber connector, wherein improvements are realized to enable accurate finished dimension of the external diameter thereof and to decrease the amount of eccentricity of a round hole to which an optical fiber is inserted, against the external surface of the plug ferrule.

A further object of the present invention is to provide a method for production of a sleeve of an adapter employable for a plastic optical fiber connector, wherein an improvement is realized to enable accurate finished dimension thereof.

To achieve the foregoing objects, a method for production of an optical fiber connector in accordance with the present invention includes a step to produce a metal mold which is employed for production of a plug ferrule in accordance with the present invention, for the purpose to allow the plug ferrule to be precisely produced.

The foregoing step to produce a metal mold which is employed for production of the plug ferrule comprises (1) a step to bore an extremely small hole of which the diameter is approximately identical to the diameter of the bare fiber of optical fibers to be connected to each other, at the center of one end of a rod of which the external diameter is approximately identical to the diameter of the plug ferrule to be produced, (2) a step to insert a pin into the foregoing extremely small hole for the purpose to produce a master mold, (3) a step to apply an electroform process to the foregoing master mold for the purpose to plate a cylindrical metal mass having a predetermined thickness on the master mold, (4) a step to remove the rod of the master mold from the cylindrical metal mass produced in the foregoing step employing an electroform process, retaining the foregoing pin in the cylindrical metal mass, for the purpose to produce a metal mold (hereinafter referred to as an electroformed mold) which will be employed for production of a metal mold to be employed for production of a plug ferrule, and (5) a step to assemble the foregoing electroformed mold, an external metal mold and a pipe to produce the metal mold to be employed for production of a plug ferrule.

A method for production of a plug ferrule in accordance with the present invention comprises a step to inject molten resin or plastic into the foregoing metal mold to be employed for production of a plug ferrule. The method allows production of a plug ferrule which is a precise copy of the master mold, and the accuracy (the amount of eccentricity) of the diameter and the positioning of an extremely small hole to which the bare fiber of an optical fiber is inserted and which is bored on one end of the plug ferrule is determined by the corresponding accuracy of the master mold. This means that once a master mold having a precise accuracy is produced, it is possible to massproduce any desired quantity of electroformed molds having the excellent magnitude of accuracy similar to that of the master mold, further resultantly enabling mass production of plug ferrules having excellent magnitude of dimensional accuracy.

A metal mold in which a rod having the external diameter slightly less than the external diameter of the master mold which is employed for production of the foregoing electroformed mold, is assembled is employed for production of a hole of a sleeve of an adaptor to be employed for a plastic optical connector, in which hole the plug ferrule is fitted, with a high amount of dimensional accuracy.

BRIEF DESCRIPTION OF THE DRAWINGS

The present invention, together with its various features and advantages, can be readily understood from the following more detailed description presented in conjunction with the following drawings, in which.

DETAILED DESCRIPTION

Figures 1, 3, 4:
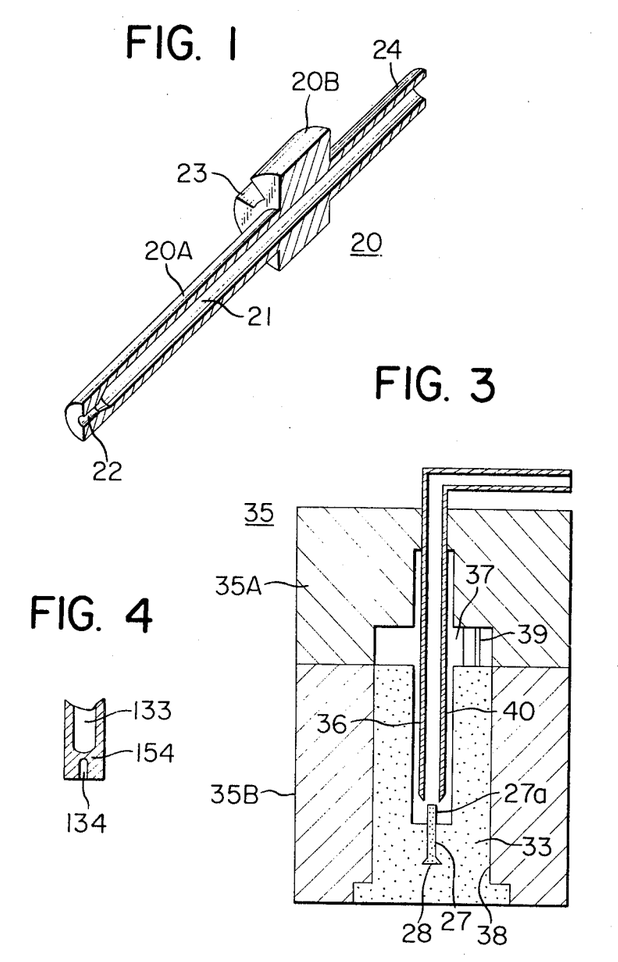
FIG. 1 is a partially cutaway perspective veiw of a plug ferrule which is assembled in an optical fiber connector which is produced employing a method for production of optical fiber connectors in accordance with one embodiment of the present invention, showing a position severed along the axis of the plug ferrule, FIGS. 2 (a), (b), (c) and (d) is a set of schematic perspective views showing the sequential steps for production of an electroformed mold which is a component of a metal mold which is employed for a method for production of a plug ferrule in accordance with one embodiment of the present invention.
FIG. 3 is a longitudinal sectional view of a metal mold employed for a method for production of a plug ferrule in accordance with one embodiment of the present invention (a sprue, a runner and a gate are not shown)
FIG. 4 is a sectional view of the tip of a plug ferrule produced employing a method for production of a plug ferrule in accordance with one embodiment of the present invention, showing the position after it is taken out of a metal mold for production of the plug ferrule.

FIG. 1 is a partially cutaway perspective view of a plug ferrule which is assembled in an optical fiber connector which is produced employing a method for production of optical fiber connectors in accordance with one embodiment of the present invention, showing a position severed along the axis of the plug ferrule. Referring to the drawing, a plug ferrule 20 is a plastic mass molded in one body, consisting of a cylinder 20A in which an optical fiber is inserted and a flange 20B molded in one body with the cylinder 20A to surround the external surface of the center portion of the cylinder 20A. The diameter of the internal hollow space 21 of the cylinder 20A is decreased at one end thereof to provide a round hole 22 in which the bare fiber of an optical fiber is inserted. A slot or recess 23 is provided on the external surface of the flange 20B along the axis of the plug ferrule 20. The function of the slot or recess 23 is to prohibit the plug ferrule 20 from rotating in a plug which will be described later.

Figure 2A:
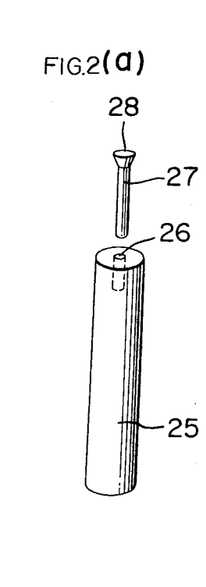
Figures 2B, 2C:
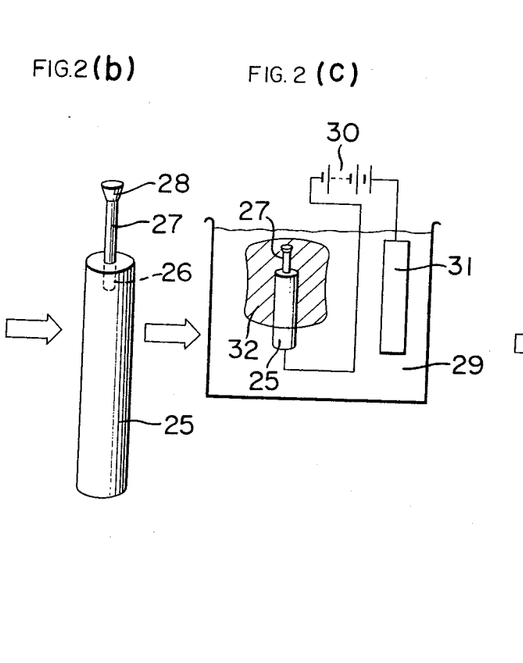
Figure 2D:
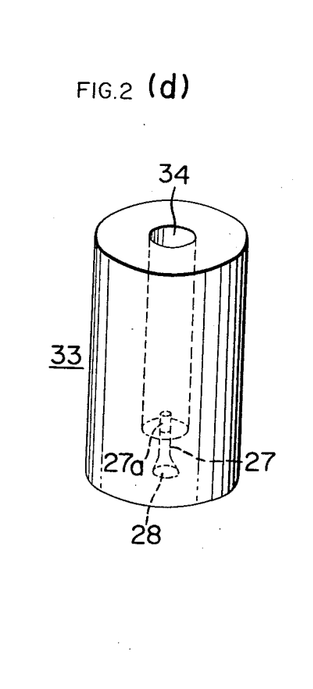

Referring to FIGS. 2 and 3, a method for production of a plug ferrule 20 of which the schematic structure is shown in FIG. 1, will be described below.

Referring to FIG. 2 (a), the first step is to produce a cylindrical rod 25 made of a metal, a ceramic or a composite material containing the foregoing materials. This rod 25 has a smooth cylindrical surface having a diameter identical to the diameter of the foregoing cylinder 20A, and has a round hole 26 at the center of one end thereof. The round hole 26 has a diameter approximately identical to that of the bare fiber of an optical fiber, and is located precisely at the center of one end of the rod 25 with a least magnitude of eccentricity. A straight pin 27 is inserted in the round hole 26 to a predetermined depth. The straight pin 27 has a diameter approximately identical to that of the bare fiber of an optical fiber and is made of a material having a high modulus of rigidity e.g. a hardened steel, a tungsten alloy, etc. FIG. 2 (b) shows the rod 25 under the aforementioned position. Further, the straight pin 27 is provided with a head 28 having a larger diameter at the other end thereof. The head 28 has a function to prevent the straight pin 27 from being removed from an electroformed mold, when the rod 25 is drawn out of the electroformed mold which will be described later, after an electroform process is finished. In the case where the rod 25 is produced of a metal, the rod 25 having the straight pin 27 inserted in the round hole 26 thereof can be employed as a master mold, which is further employed for a nickel plating process which is carried out in a nickel plating bath 29 shown in FIG. 2 (c). In the case where the rod 25 is produced of a ceramic, the rod 25 is plated with a chromium-gold layer employing an evaporation process, before it is dipped in a nickel plating bath 29 for production of an electroformed mold. The indicated as 30 and 31 are respectively an electric power supply and a nickel electrode for the electroform process.

After an electroformed body 32 grows to surround the foregoing rod 25 having the straight pin 27 inserted therein, to a predetermined thickness, the rod 25 having the electroformed body 32 grown thereon is taken out of the nickel plating bath 29, before the rod 25 is drawn out of the electroformed body 32, ultimately producing an electroformed mold 33 having a cylindrical hollow space 34 and of which the external surface is machined to make it round, as shown in FIG. 2 (d). As described earlier, the head 28 functions to keep the straight pin 27 in the electroformed mold 33. The straight end of the straight pin 27 inserted in the round hole 26 of the rod 25 remains as a projection 27a which is projected into the cylindrical hollow space 34 of the electroformed mold 33. This projection 27a is necessary to produce the round hole 22 in the plug ferrule 20 shown in FIG. 1. The cylindrical hollow space 34 has a diameter identical to the external diameter of the rod 25, and the projection 27a is located just at the center of the cylindrical hollow space 34 with a least amount of eccentricity.

Referring to FIG. 3, a metal mold 35 which is to be employed for production of a plug ferrule is produced by assembling the foregoing electroformed mold 33, a pair of upper and lower dies 35A and 35B and a pipe 40. The upper die 35A has an annular recess 37 (a portion of a cavity 36) which is necessary for production of the flange 20B and a cylindrical hollow space which is necessary for production of the other portion of the cylinder 20A of a plug ferrule 20 to be produced. The lower die 35B has a large cylindrical hollow space 38 which receives the foregoing electroformed mold 33. A projection 39 provided at a portion in the annular recess 37 produced in the upper die 35A has a function to produce the slot or recess 23 of which prevent the plug ferrule from rotating in the plug, during the molding process. A pipe 40 is arranged in the cavity 36, to provide a small gap between the bottom end of the pipe 40 and the projection 27a of the straight pin 27. The function of the pipe 40 which is arranged along the axis of the cavity 36 is to act as a core during the molding process. The purpose of the small gap between the bottom end of the pipe 40 and the projection 27a of the straight pin 27 is to provide a passage for gas to be purged from the mold and for excess molten resin to be drained during the molding process. Albeit an arbitrary distance can be selected for the small gap, a too small distance causes the bottom end of the pipe 40 to contact the top end of the straight pin 27, and too large a distance causes difficulties for boring a hole which interconnects the internal hollow space 21 and the round hole 22 of the plug ferrule 20 produced. The determined appropriate size of the small gap is 1-2 mm.

The upper metal mold 35A is provided with a sprue, a runner and a gate (not shown) at an arbitrary location for the purpose to allow a molten resin e.g. phenolic resin containing short glass fibers to pass through them to be injected into the cavity 36.

After the resin is hardened, the molded mass is taken out of the metal mold 35. The sectional view of the tip of the molded mass or a half-finished plug ferrule is as shown in FIG. 4. In other words, the internal hollow space 133 or 21 shown in FIG. 1 and the round hole 134 or 22 shown in FIG. 1 are separated by a thin wall 154, which is produced due to the necessity to purge gas during the molding process. When a thin wall 154 is removed by drilling and a hole is bored lastly, the molded mass is converted to a plug ferrule 20 as shown in FIG. 1.

When an example was produced, a ceramic rod 25 having the diameter of 2.499 mm and the length of 15 mm, having a round hole 26 with the diameter of 0.125 mm and the depth of 1 mm and with the amount of deviation of the round hole 26 against the external surface of the ceramic rod of ±0.5 micrometers, and a hardened steel pin 27 having the diameter of 0.124 mm and which is inserted in the round hole 26 are employed. The assembly of the ceramic rod 25 having the hardened steel pin 27 inserted in the round hole 26 thereof is coated by an evaporation process to plate a chromium-gold plate thereon. The plated assembly is then coated by an electroform process to produce an electroformed mold 33 of a nickel mass. The mold 33 is assembled with a metal mold 35 and employed for production of a plug ferrule 20 of a phenolic resin containing short glass fibers. The plug ferrule 20 is determined to have a cylinder 20A having the external diameter of 2.488 mm and a round hole 22 having the diameter of 0.125 mm, an out-of-roundness of 1 micrometer and an eccentricity of 2 micrometers.

Figure 5:
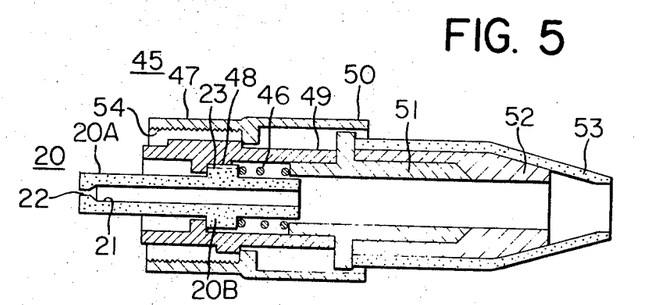
FIG. 5 is a longitudinal sectional view of a plug in which a plug ferrule produced employing a method for production of a plug ferrule in accordance with one embodiment of the present invention is assembled.

FIG. 5 is a longitudinal sectional view of a plug in which a plug ferrule 20 produced employing a method for production of a plug ferrule in accordance with one embodiment of the present invention is assembled. The plug 45 consists of (1) a plug ferrule 20, (2) a coil spring 46 which is fitted along the external surface of one end of the plug ferrule and which exerts a predetermined amount of pressure, in the case where a pair of the foregoing plug ferrules are arranged in an adaptor which will be described later, so that the ends of a pair of bare fibers of optical fibers to be connected with each other are compressed to each other, (3) a guide pipe 49 in which the foregoing plug ferrule 20 and the coil spring 46 are inserted and which has an external projection 47 provided on the external surface thereof and an internal projection 48 provided on the internal surface thereof both of which projections have a function to prohibit the plug ferrule 20 from rotating in the plug 45, (4) a cup 50 which is fitted along the external surface of the foregoing guide pipe 49, and (5) a supporter 51 one end of which is fitted along the internal surface of the foregoing guide pipe 49 for the purpose to impose a limitation to the distance wherein the plug ferrule 20 is movable and to prohibit the foregoing cup 50 from being removed from the external surface of the guide pipe 49, and which is to fix a tension member (not shown) arranged in an optical fiber to the plug 45, (6) a coupling 52 which is fitted along the external surface of the foregoing supporter 51 and which is to make sure the fixation (by means of an adhesive) of the foregoing tension member, and (7) a protective ring 53 which is produced of an elastic material, which is fitted along the external surface of the foregoing coupling 52 and which has a function to decrease the amount of the bending loss for an optical fiber. The projection 48 arranged along the internal surface of the foregoing guide pipe 49 is fitted with the recess 23 whose function is to prohibit the plug ferrule 20 from rotating in the plug 45. A female screw 54 is provided along the internal surface of a portion of the foregoing cup 50 which portion faces an adaptor which will be described later. The coil spring 46 is produced of a stainless steel wire having the diameter of 0.4 mm. The protective ring 53 is produced of a urethane elastomer. The foregoing guide pipe 49, the cup 50, the supporter 51, and the coupling 52 all of which are produced of a plastic and the foregoing coil spring 46 are members of a holder for the plug ferrule 20.

Figure 6:
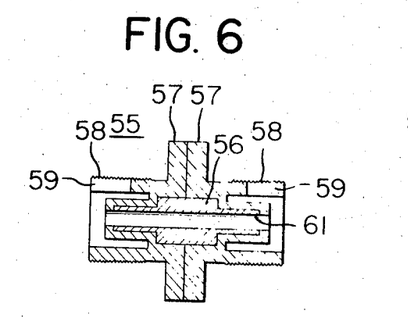
FIG. 6 is a longitudinal sectional view of an adaptor with which the plug shown in FIG. 5 is interconnected.

FIG. 6 is a longitudinal sectional view of an adaptor with which the foregoing plug is interconnected. The adaptor 55 consists of a sleeve 56 and a pair of sleeve holders 57 each of which is identical to each other in shape and both of which are produced in one body, and are fitted with the external surface of the sleeve 56. A male screw 58 which is to mesh with the foregoing female screw 54 of the foregoing cup 50 is provided along the external surface of the sleeve holder 57. A recess 59 with which the projecton 47 of the guide pipe 49 is provided along the external surface of the sleeve holder 57.

Figure 7A:
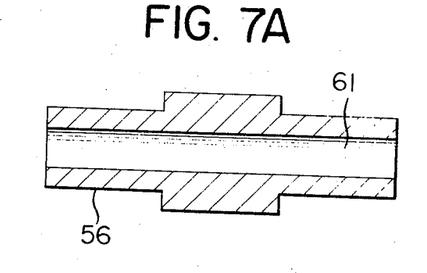
FIG. 7A is a longitudinal sectional view of a cylindrical sleeve, a component of the adaptor.
Figure 7B:
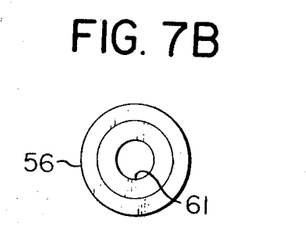
FIG. 7B is a transverse sectional view of the cylindrical sleeve of which the longitudinal sectional view is illustrated in FIG. 7A.
Figure 9:
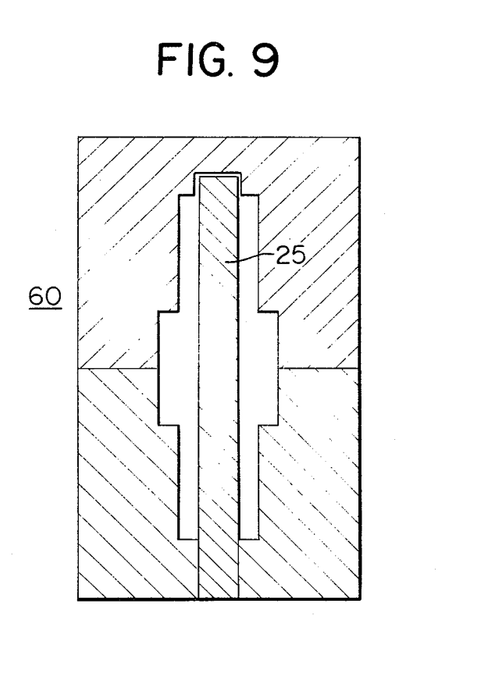
FIG. 9 is a longitudinal sectional view of a metal mold which is employed for production of a sleeve.

The accuracy of the internal diameter of the foregoing sleeve 56 is very important. Therefore, in the case of a cylindrical sleeve 56 as shown in FIGS. 7A and 7B, a rod having an external diameter similar to that of the rod 25 (Refer to FIG. 2.) which is employed for production of the electroformed mold 33 which is to be employed for production of the plug ferrule is employed, so that the plug ferrule 20 can be inserted without remaining a gap therearound and incidentally can be removed. FIG. 9 is a longitudinal sectional view of an example of a metal mold 60 which is employed for production of a sleeve and which employs the rod 25. The metal mold 60 is completed the production, when a sprue, a runner and a gate (not shown) are provided to the metal mold proper that is shown in FIG. 9. A sleeve 56 which is shown in FIGS. 7A and 7B and which has a hole 61 which allows the plug ferrule 20 to be inserted without a gap therebetween can be produced, when a molten resin identical to the material of the plug ferrule 20 is injected into the metal mold 60.

Figure 8:
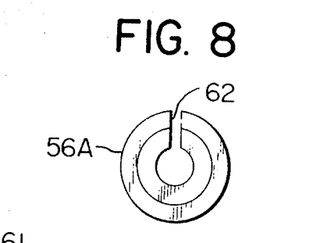
FIG. 8 is a transverse sectional view of a sleeve having a slit along the axis thereof.

On the other hand, in the case of a slit sleeve 56A as shown in FIG. 8, a slit sleeve 56A which is shown in FIG. 8 is produced, when (1) a rod having an external diameter slightly less than the external diameter of the rod which is employed for production of a plug ferrule is assembled in the metal mold 60, (2) a cylindrical sleeve is molded employing the metal mold 60 assembled with the foregoing rod, and (3) a cutter is employed for production of a slit 62 in the cylindrical sleeve. When a rod having the external diameter of 2.487 mm was employed, a slit sleeve 56A having the internal diameter of 2.478 mm was produced. A diamond rotary cutter having the blade thickness of 0.2 mm was employed for providing a slit 62 to the foregoing sleeve.

The adaptor 55 having the foregoing structure is connected with a pair of plugs 45. By this step, the plug ferrules 20 assembled in both plugs 45 are inserted into the hole 61 of the sleeve 56, and the ends of both plug ferrules 20 are allowed to contact to each other. As a result, the cup 50 is connected with the sleeve holder 57 by means of screw.

Since no accuracy is required for the dimension of the plug ferrule holder assembled in the plug ferrule 45 and the sleeve holder 57, the guide pipe 49, the cup 50, the supporter 51, the coupling 52 and the sleeve holder 57 are produced by molding the ABS resin in the metal molds each of which is produced by machining. Needless to emphasize, each of such components is required to be reliable and to have a structure which allows easy assembling and disassembling.

To determine the connection performance of an optical fiber connector in accordance with one embodiment of the present invention, an optical fiber cable consisting of a bare fiber which is a graded index fiber made of quartz having a core diameter of 50 micrometers and an outer diameter of 125 micrometers, a tension member made of a polyamid fiber, and an external sheath of poly vinyl chloride, is employed. In order to connect a fiber with a fiber ferrule, a sheath coated fiber which is stripped for an approximate length of 3 mm is inserted into the internal hollow space 21 of the plug ferrule 20, until the end of the bare fiber hangs out of the round hole 22. Thereafter, a diamond cutter is employed to cut the end of the bare fiber which hangs out of the round hole 22. The cut end is subjected to a polishing process employing a sheet of emery paper having the grain size of No. 600 applied to the cut end of the bare fiber and a buffing process employing alumina powder applied to the polished end of the bare fiber, so as to make the surface of the end of the bare fiber an accurate and smooth surface. A quick hardening adhesive is employed for assembling the plug 45 with the adaptor 55.

The connection loss was determined to be 0.56 dB, when a measurement was carried out employing an LED light source having a wave length of 0.85 micrometers and a mode scrambler of 1 kilometer. A period of approximately 30 minutes was needed for the assembly. The plug 45 was 1.5 grams in weight and the adaptor was 1 gram in weight. The adaptor 55 having two plugs 45 assembled on the both ends thereof was 70 mm in length and 10 mm in diameter. The periods for production of the plug ferrule 20, the sleeve 56, a holder of the plug 45 and a holder of the adaptor 55 were, respectively, 5 minutes, 5 minutes, 4 minutes and 4 minutes.

Figure 10:
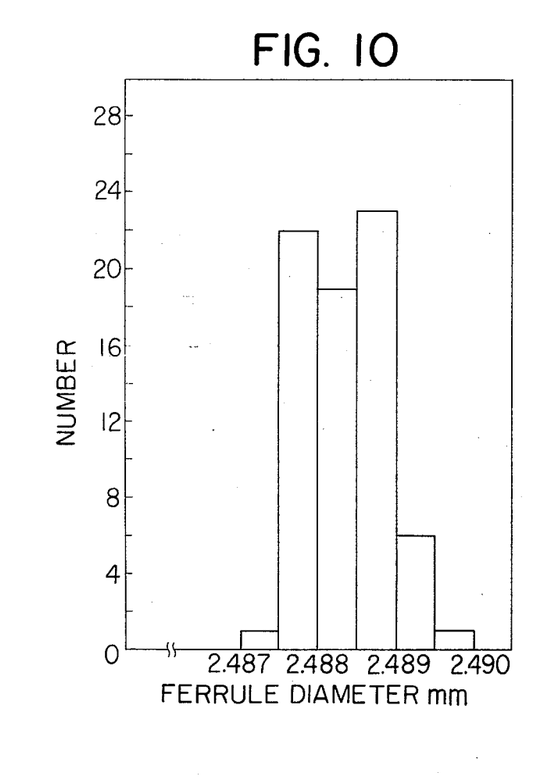
FIG. 10 is a histogram showing an exemplary distribution of the external diameter of a plug ferrule produced employing a method for production of a plug ferrule in accordance with one embodiment of the present invention.

Results of measurement for the dimensional accuracy of the plug ferrule produced employing a method described referring to FIGS. 2 and 3, will be described below. As a group of test samples, 72 pieces of the plug ferrules 20 were produced under the same conditions. FIG. 10 shows the distribution of the external diameter determined for the foregoing 72 pieces of the plug ferrule 20. Referring to the histogram, the determined average external diameter is 2.4884 mm, including 70 pieces within the 2-micrometer range of between 2.4875 mm and 2.4895 mm. This means that 97% of the products are within the accuracy range of 1 micrometer above or below the average amount.

Figure 11:
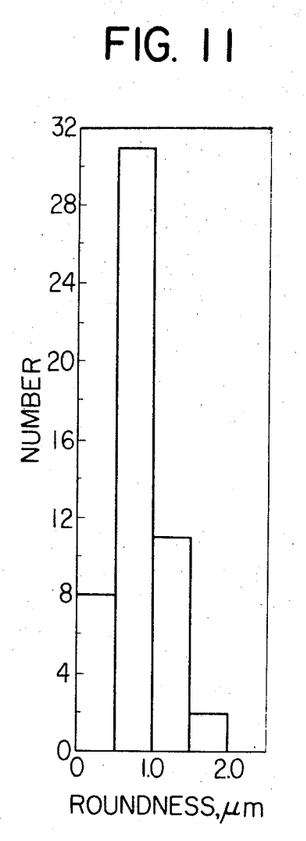
FIG. 11 is a histogram showing an exemplary distribution of the out-of-roundness of a plug ferrule produced employing a method for production of a plug ferrule in accordance with one embodiment of the present invention.

A random sampling method was employed to select 52 pieces of the plug ferrule 20 out of the foregoing 72 pieces, and the out-of-roundness measurement was applied to the selected 52 pieces. An out-of-roundness tester was employed for this measurement. FIG. 11 shows the distribution of the out-of-roundness determined for the foregoing 52 pieces of the plug ferrule 20. Referring to the histogram, 39 pieces are within the out-of-roundness range of 1 micrometer and 50 pieces are within the out-of-roundness range of 1.5 micrometers.

Figure 12:
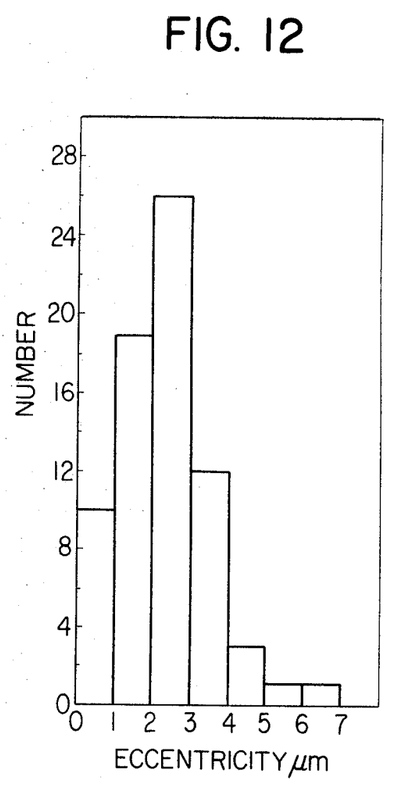
FIG. 12 is a histogram showing an exemplary distribution of the eccentricity of a center hole against the external surface of a plug ferrule produced employing a method for production of a plug ferrule in accordance with one embodiment of the present invention.

An out-of-roundness tester was again employed to determine the eccentricity of the foregoing 72 pieces of the plug ferrule 20 produced employing a method in accordance with the present invention. FIG. 12 shows the distribution of the eccentricity determined for the 72 pieces of the plug ferrule 20. Referring to the histogram, the determined average eccentricity is 2.8 micrometers which can be recognized as a quite marginal amount. Moreover, the direction in which the eccentricity was detected is determined to be in the same direction for the all products.

Figure 13:
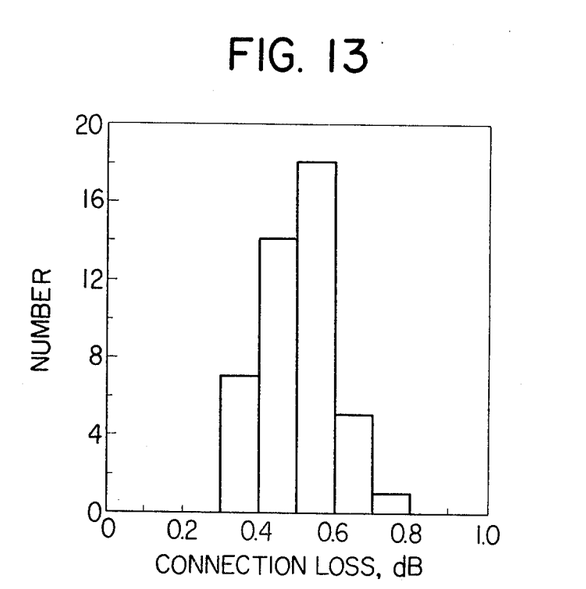
FIG. 13 is a histogram showing an exemplary distribution of the optical fiber connection loss of an optical fiber connector in which a plug ferrule produced employing a method for production of a plug ferrule in accordance with one embodiment of the present invention is assembled.

Out of the foregoing 72 pieces of the plug ferrules 20, 10 pieces were selected by the random sampling method for the purpose to assemble 10 pieces of plugs 45 shown in FIG. 5, each of which contains an optical fiber therein. Thereafter, these plugs 45 and adaptors 55 having slit sleeves (shown in FIG. 8) assembled therein are employed for connection of optical fibers, before measurement was carried out to determine the connection loss thereof. FIG. 13 shows the distribution of the connection loss determined for the 10 optical fiber connectors. Referring to the histogram, the determined average amount of connection loss is 0.53 dB which is evidently an extremely small amount.

Figure 14:
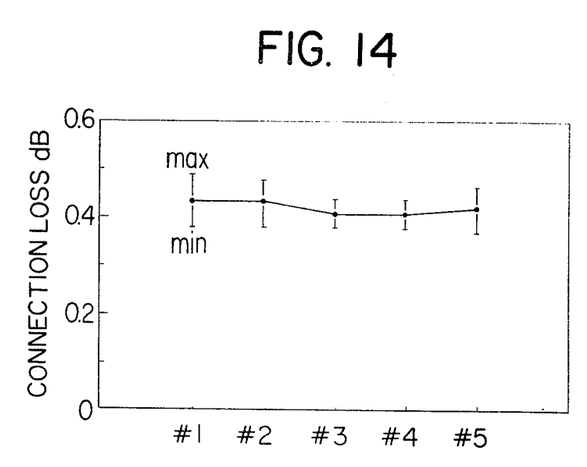
FIG. 14 is a graph showing the amount of the optical fiber connection loss determined during intervals between repeated actions to assemble and disassemble an optical fiber connector in which a plug ferrule produced employing a method for production of a plug ferrule in accordance with one embodiment of the present invention is assembled.

Out of the foregoing 10 pieces of the optical fiber connectors produced by assembling the plugs 45 and the adaptor 55, 5 pieces were selected, to determine the potential adverse effect of repeated actions to assemble and disassemble the optical fiber connectors. After each of the 5 connectors is respectively given a number, each of the connectors is assembled and disassembled for 10 times. After each action consisting of assembling and disassembling thereof, measurement for the connection loss was carried out for each connector. FIG. 14 shows the average, maximum and minimum amounts of the optical fiber connection loss determined for each of the 5 connectors.

Referring to FIG. 14, the deviation between the maximum and minimum amounts does not exceed 0.05 dB above or below the average amount, proving that the repeated actions to assemble and disassemble the optical fiber connectors are not influential to the connection loss.

Figure 15:
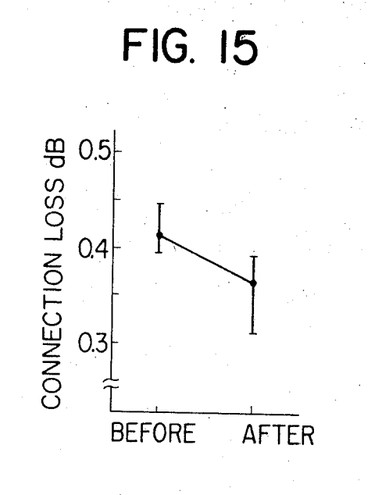
FIG. 15 is a graph comparing the amount of the optical fiber connection loss before and after 1,000 actions to assemble and disassemble an optical fiber connector in which a plug ferrule produced employing a method for production of a plug ferrule in accordance with one embodiment of the present invention is assembled.

Further, one of the foregoing optical fiber connectors which underwent the foregoing examination, specifically the fiber connector given No. 3, was tested by numerous actions to assemble and disassemble it, to determine the potential magnitude of reduction in the connection loss caused by the foregoing repeated actions to assemble and disassemble the optical fiber connector. Firstly, the specific optical fiber connector was subjected to ten repeated actions of assembly and disassembly, during which the maximum, average and minimum amounts of the connection loss were measured. Secondly, the same specific optical fiber connector was subjected to 1,000 repeats of such repeated actions. Thirdly, the same optical fiber connector was subjected to ten repeats of such repeated actions, during which the maximum, average and minimum amounts of the connection loss were measured. FIG. 15 compares the maximum, average and minimum amounts of the connection loss measured before and after the 1,000 repeated actions to assemble and disassemble the connector. Referring to FIG. 15, the determined reduction in the average amount of connection loss is approximately 0.05 dB and the corresponding amounts for the maximum and minimum amounts are within 0.1 dB.

Figure 16:
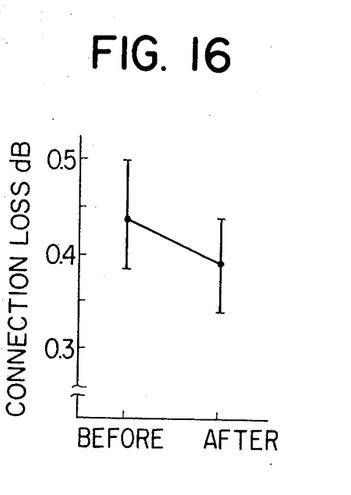
FIG. 16 is a graph comparing the amount of the optical fiber connection loss before and after application of a heat cycle between −20° C. and +60° C., FIGS. 17 (a), (b), (c), and (d) are a set of schematic perspective views showing the sequential steps for production of an electroformed mold which is employed for production of a plug ferrule having a flange in accordance with another embodiment of the present invention.

In addition, a heat cycle test was applied to one of the foregoing optical fiber connectors, specifically the fiber connector given the number 1. The criteria of the heat cycle test was that the temperature was alternated between the range of −20° C. and +60° C. with a cycle time of 12 hours. FIG. 16 compares the maximum, average and minimum amounts of the connection loss measured before and after the heat cycle test. Referring to FIG. 16, the determined reduction in the average amount of connection loss is approximately 0.05 dB and the corresponding amounts for the maximum and minimum amounts are within 0.1 dB.

Figure 17:
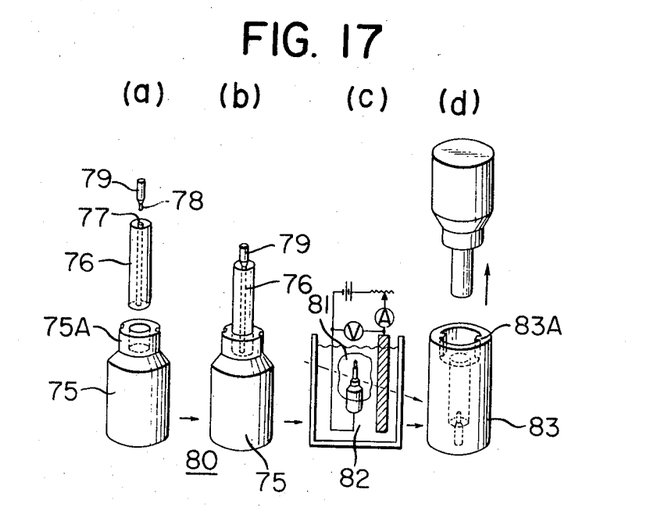
Figure 18:
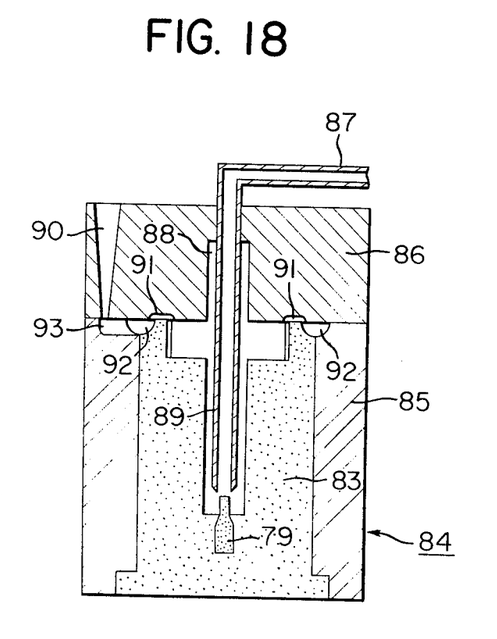
FIG. 18 is a longitudinal sectional view of a metal mold which is employed for production of a plug ferrule and which is produced employing the electroformed mold produced employing a method of which the sequential steps are illustrated in FIG. 17.
Figure 19:
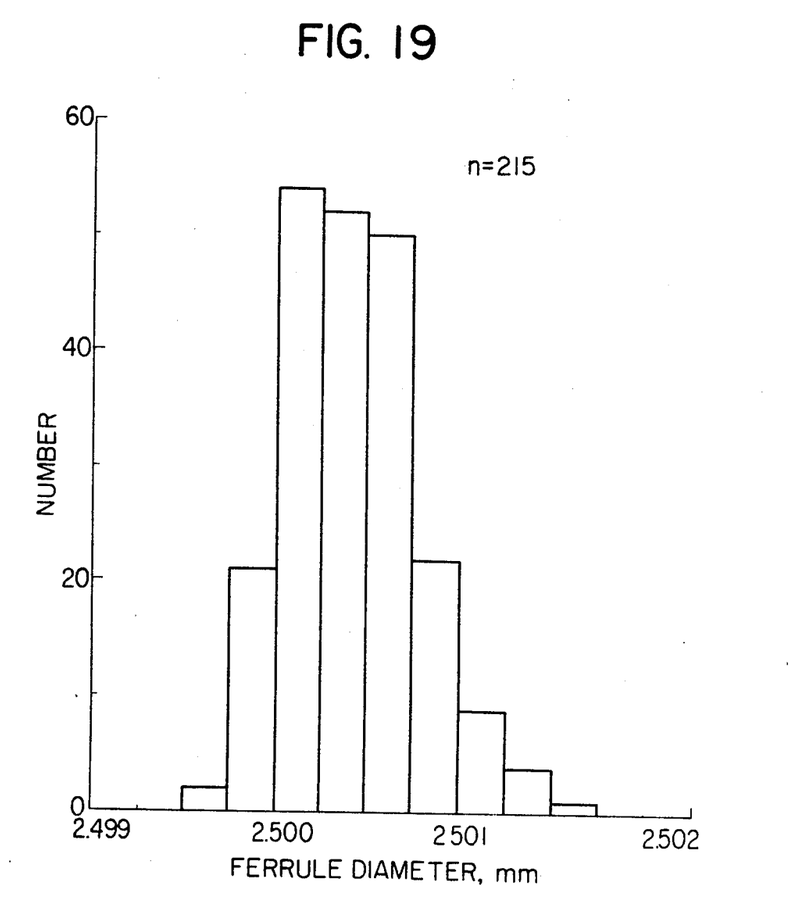
FIG. 19 is a histogram showing an exemplary distribution of the external diameter of a plug ferrule produced employing a method for production of a plug ferrule in accordance with another embodiment of the present invention.
Figure 20:
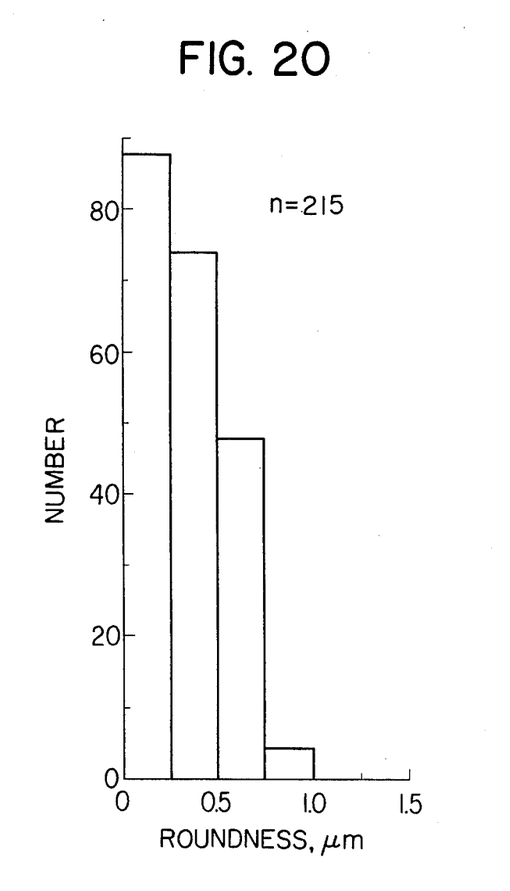
FIG. 20 is a histogram showing an exemplary distribution of the out-of-roundness of a plug ferrule produced employing a method for production of a plug ferrule in accordance with another embodiment of the present invention.
Figure 21:
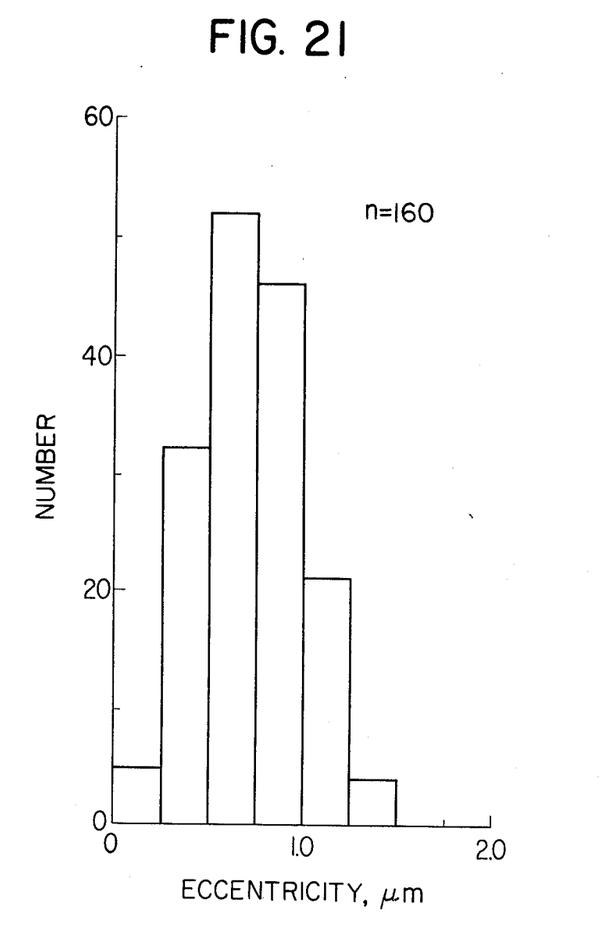
FIG. 21 is a histogram showing an exemplary distribution of the eccentricity of the small hole against the external surface of a plug ferrule produced employing a method of production of a plug ferrule in accordance with another embodiment of the present invention.
Figure 22:
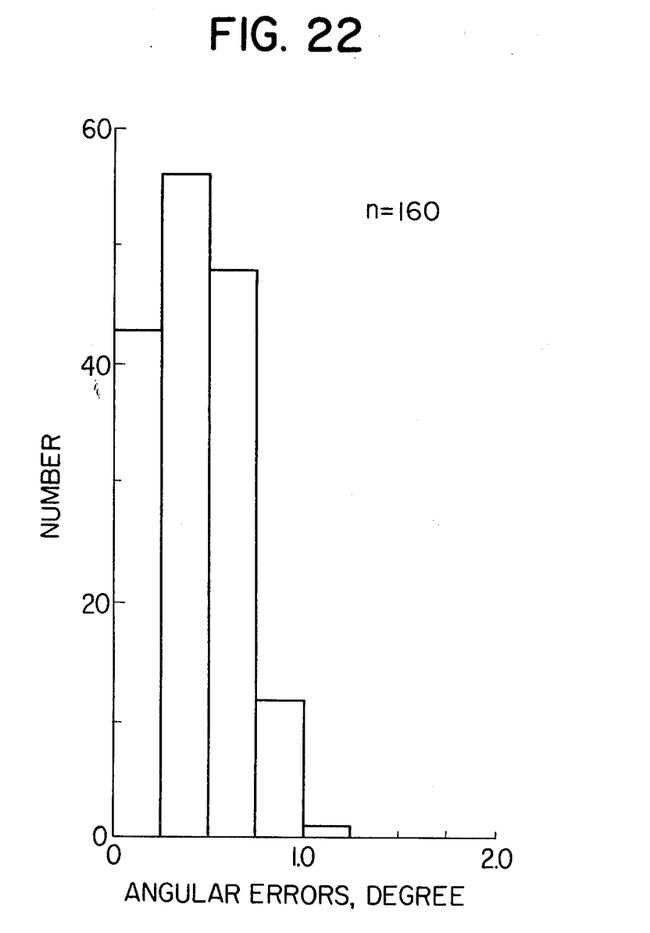
FIG. 22 is a histogram showing an exemplary distribution of the angular errors in the direction of light beam emitted from the small hole of a plug ferrule produced employing a method of production of a plug ferrule in accordance with another embodiment of the invention.

Referring to FIGS. 17 and 18, a method for production of a plug ferrule to be employed for an optical fiber connector in accordance with another embodiment of the present invention will be described below. This embodiment realizes an improvement applicable to the method for production of a plug ferrule described earlier referring to FIGS. 2 and 3. The feature of this embodiment is that an electroformed mold having a cavity corresponding to the flange 20B of a plug ferrule 20 is employed. In other words, such an electroformed mold having a stepped shape rather than a simple cylindrical shape is produced by the electroform process.

Referring to FIG. 17 (a), the first step is to produce a cylindrical rod 76 made of a metal, a ceramic or a compound material composed of the foregoing materials. This rod 76 has a smooth cylindrical surface having a diameter identical to the diameter of the foregoing cylinder 20A, and has a through hole or a penetrating hole 77 at the center thereof, making the rod 76 a pipe. The through hole or the penetrating hole 77 has a diameter approximately identical to that of the bare fiber of an optical fiber. On the top of a shank 75, a mold 75A having a shape identical to the flange 20B of the plug ferrule 20 is produced. On the top center of the mold 75A, a recess is available in which one end of the rod 76 can be inserted. Referring to FIG. 17 (b), one end 78 of a straight pin 79 is inserted in the top end of the through hole or the penetrating hole 77 of the rod 76 to a predetermined depth. The end 78 of the straight pin 79 has a diameter approximately identical to that of the bare fiber of an optical fiber and is made of a material having a high modulus of rigidity e.g. a hardened steel, a tungsten alloy, etc. A master mold 80 is finished production, when the bottom end of the rod 76 is inserted to the recess of the mold 75A produced on the top of the shank 75. The master mold 80 is plated with a chromium-gold plate employing an evaporation process, before it is dipped in a nickel plating bath 82 for production of an electroformed mold 83 (Refer to FIG. 17 (c).).

After an electroformed body 81 grows to surround the foregoing rod 76, the straight pin 79 and the upper portion of the shank 75 to a predetermined thickness, the electroformed body 81 is taken out of the nickel plating bath 82, before the external surface of the electroformed body 81 is machined and the master mold 80 is drawn out of the electroformed body 81, resultantly producing an electroformed mold 83 having a stepped cylindrical hollow space 83A which corresponds to the cylinder 20A attached by the flange 20B of the plug ferrule 20, as shown in FIG. 17 (d).

Referring to FIG. 18, a metal mold which is to be employed for production of a plug ferrule is produced by assembling the foregoing electroformed mold 83, a pair of upper and lower dies 86 and 85 and a pipe 87. The upper die 86 has a recess 88 which is necessary for production of a cylindrical portion 24 of a plug ferrule 20.

The upper metal mold 86 is provided with a sprue 90 and a ring gate 91, and the lower metal mold 85 is provided with, a runner 93 and a ring gate 92 at an arbitrary location for the purpose to allow a molten resin e.g. phenolic resin containing short glass fibers to pass through them to be injected into the cavity 89. Particularly because the ring gate 92 has an annular shape, it is effective to supply the molten resin uniformly into the cavity 89. The pipe 87 functions to purge gas and drain the excess quantity of the molten resin, during the molding process. After the resin is hardened, the molded mass is taken out of the metal mold. In the case where phenolic resin containing short glass fibers is employed, the appropriate molding temperature and transfer pressure were respectively 170° C.±2° C. and 250 Kg/cm²±10 Kg/cm².

FIGS. 19 through 22 shows results of measurements carried out for the plug ferrules produced employing the method described above. These results show better results than the corresponding ones for the other embodiment described with reference to FIGS. 10 through 12. This means that a considerable magnitude of improvement has been realized for the foregoing second embodiment in comparison with the foregoing first embodiment, the improvement being brought out during the period after the measurements of which the results are shown in FIGS. 12 through 16 were carried out particularly from the realistic viewpoints e.g. the aforementioned improvement applied to the structure of a gate for a mold.

Albeit the present invention has been described with reference to preferable embodiments applicable to production of single core optical fiber connectors, it is clear that the present invention is applicable to production of multiple core optical fiber connectors. For example, it is possible to mass-produce high precision metal molds which are to be employed for production of plug ferrules which are employable for multiple core optical fiber connectors, when employing an electroformed mold which comprises a plurality of rods which are fitted in parallel with one another and each of which has a pin inserted in the hole thereof, as a master mold. As a result, it is readily possible to mass-produce high precision plug ferrules employable for multiple core optical fiber connectors.

Albeit the present invention has been described with reference to specific embodiments, this description is not meant to be construed in a limiting sense. Various modifications of the disclosed embodiments, as well as other embodiments of the present invention, will be apparent to persons skilled in the art upon reference to the description of the present invention. It is therefore contemplated that the appended claims will cover any such modifications or embodiments as fall within the true scope of the present invention.

What is claimed is:

1. A method for producing a plastic plug ferrule for use in an optical fiber connector, said method comprising the steps of:

providing a cylindrical rod having a round hole in the center of one end, said hole having a diameter approximately identical to the diameter of a bare fiber of an optical fiber to be connected;

inserting a pin having a cylindrical outer portion and a diameter approximately equal to the diameter of said bare fiber in said round hole, said pin cooperating with said rod to constitute a master mold;

electroplating a metal layer having a predetermined thickness on the external surfaces of said master mold to produce an electroformed mass surrounding said master mold except for an end portion of said rod opposite the rod end having said hole therein, said pin being at least partially embedded in said electroformed mass;

withdrawing said rod from said electroformed mass to convert said mass to an electroformed mold having a cylindrical recess therein with an end of said pin extending into said recess from the bottom of the recess, said pin being aligned along the central axis of the recess;

disposing a cylindrical pipe in said recess with said pipe aligned coaxially with said recess and one end of said pipe spaced a given distance from said end of said pin, to provide a passage for gas to be purged and for excess molten resin to be drained during the subsequent molding step;

introducing a fluid plastic resin between the outer surface of said pipe and the inner wall of said recess to produce a cylindrical plastic plug ferrule upon solidification of said fluid resin, said ferrule having a central bore and an end with a hole therein aligned with said central bore; and removing any plastic material between said hole in the end of said ferrule and said central bore, so that said central bore of said ferrule communicates with said hole therein.

2. The method according to claim 1, wherein said given distance is in the range of 1 to 2 mm.

3. The method according to claim 1, wherein said pin comprises a metal having a high modulus of rigidity selected from the group consisting of hardened steel and tungsten alloys.

4. The method according to claim 1, comprising the additional step of forming a flange on said ferrule during said fluid resin introducing step, by providing a flange-forming mold portion adjacent said recess of said electroformed mold.

5. The method according to claim 1, wherein said pin has an enlarged portion remote from said end thereof, to prevent movement of said pin with respect to said electroformed mass.

* * * * *